(12) United States Patent    (10) Patent No.:   US 12,664,863 B2

Atallah et al.    (45) Date of Patent:   *Jun. 23, 2026

(54) SELF-CHECKOUT WORKFLOW MANAGEMENT SYSTEM

(71) Applicant: TOSHIBA GLOBAL COMMERCE SOLUTIONS, INC., Durham, NC (US)

(72) Inventors: Judith L. Atallah, Raleigh, NC (US); Charles Ray Kirk, Raleigh, NC (US); Evgeny Shevtsov, Plano, TX (US); Michelle M. Crompton, Raleigh, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/005,747

(22) Filed: Dec. 30, 2024

(65) Prior Publication Data

US 2025/0148885 A1    May 8, 2025

Related U.S. Application Data

(63) Continuation of application No. 18/164,510, filed on Feb. 3, 2023, now Pat. No. 12,183,170.

(51) Int. Cl.
| | |
|---|---|
| *G07G 1/00* | (2006.01) |
| *G06V 10/764* | (2022.01) |
| *G07G 1/01* | (2006.01) |

(52) U.S. Cl.
CPC ......... *G07G 1/0036* (2013.01); *G06V 10/764* (2022.01); *G07G 1/01* (2013.01)

(58) Field of Classification Search
CPC ...... G07G 1/0036; G07G 1/01; G07G 1/0018; G07G 1/0045; G07G 1/0063; G06V 10/764; G06N 20/00; G06Q 20/18
See application file for complete search history.

(56) References Cited

U.S. PATENT DOCUMENTS 12,183,170 B2 * 12/2024 Atallah .................. G06Q 20/18

FOREIGN PATENT DOCUMENTS

WO   WO-2021186174 A1 * 9/2021 ............. G06V 20/52

\* cited by examiner

*Primary Examiner* — Matthew Mikels
(74) *Attorney, Agent, or Firm* — Patterson + Sheridan, LLP; Gero G. McClellan

(57) ABSTRACT

Techniques to reconfigure self-checkout kiosks based on workflow interaction metrics. A measure of interaction is determined for at least a portion of a workflow during a transaction at a self-checkout kiosk. The self-checkout kiosk is configured to output one or more communications via one or more graphical user interface (GUI) screens associated with the workflow. A communication level is set for the workflow for the transaction. The communication level is determined based on the measure of interaction and without requiring an intervention. A next communication to output is determined based on the communication level. The transaction is executed at the self-checkout kiosk.

16 Claims, 5 Drawing Sheets

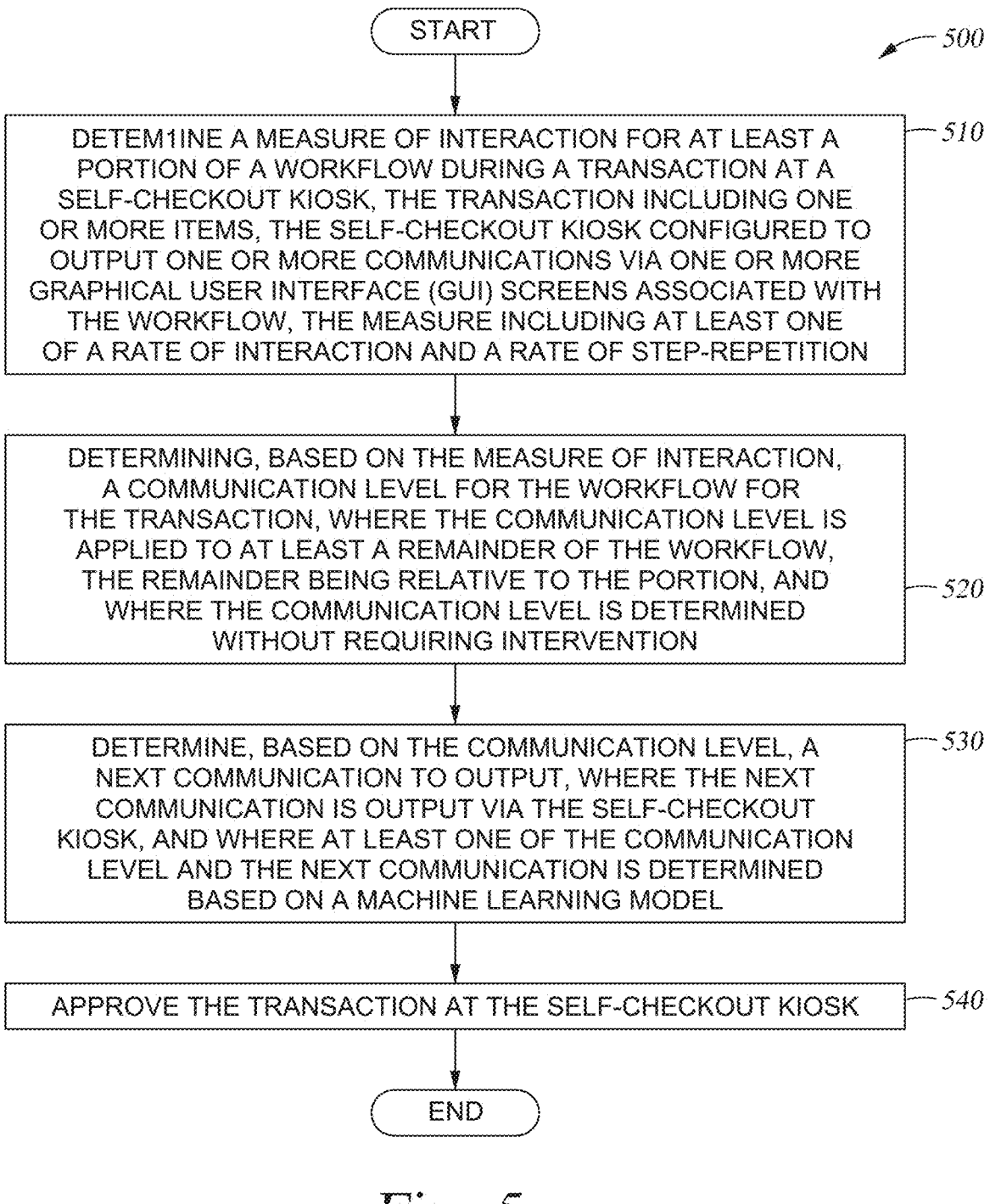

START

_500_

DETEM1INE A MEASURE OF INTERACTION FOR AT LEAST A PORTION OF A WORKFLOW DURING A TRANSACTION AT A SELF-CHECKOUT KIOSK, THE TRANSACTION INCLUDING ONE OR MORE ITEMS, THE SELF-CHECKOUT KIOSK CONFIGURED TO OUTPUT ONE OR MORE COMMUNICATIONS VIA ONE OR MORE GRAPHICAL USER INTERFACE (GUI) SCREENS ASSOCIATED WITH THE WORKFLOW, THE MEASURE INCLUDING AT LEAST ONE OF A RATE OF INTERACTION AND A RATE OF STEP-REPETITION _510_

DETERMINING, BASED ON THE MEASURE OF INTERACTION, A COMMUNICATION LEVEL FOR THE WORKFLOW FOR THE TRANSACTION, WHERE THE COMMUNICATION LEVEL IS APPLIED TO AT LEAST A REMAINDER OF THE WORKFLOW, THE REMAINDER BEING RELATIVE TO THE PORTION, AND WHERE THE COMMUNICATION LEVEL IS DETERMINED WITHOUT REQUIRING INTERVENTION _520_

DETERMINE, BASED ON THE COMMUNICATION LEVEL, A NEXT COMMUNICATION TO OUTPUT, WHERE THE NEXT COMMUNICATION IS OUTPUT VIA THE SELF-CHECKOUT KIOSK, AND WHERE AT LEAST ONE OF THE COMMUNICATION LEVEL AND THE NEXT COMMUNICATION IS DETERMINED BASED ON A MACHINE LEARNING MODEL _530_

APPROVE THE TRANSACTION AT THE SELF-CHECKOUT KIOSK _540_

END

_Fig. 5_

SELF-CHECKOUT WORKFLOW MANAGEMENT SYSTEM

CROSS-REFERENCE TO RELATED APPLICATIONS

This application is a continuation of U.S. patent application Ser. No. 18/164,510, filed Feb. 3, 2023, which is herein incorporated by reference in its entirety for all purposes.

BACKGROUND

Self-checkout kiosks are an increasingly popular way to manage Point-of-Sale (POS) transactions in retail environments. Individuals using such kiosks are responsible for scanning, packing, and completing the transaction themselves. This allows the individuals greater control over the exchange than at traditional terminals staffed by checkout personnel such as cashiers and/or baggers.

BRIEF DESCRIPTION OF THE SEVERAL VIEWS OF THE DRAWINGS

FIG. 5 is a flowchart depicting a method to manage the self-checkout kiosk based on workflow interaction, according to one embodiment presented in this disclosure.

DETAILED DESCRIPTION

Embodiments presented in this disclosure provide techniques of self-checkout management based on workflow interaction metrics. One embodiment includes an application configured to determine a measure of interaction for at least a portion of a workflow during a transaction at a self-checkout kiosk. The self-checkout kiosk is configured to output one or more communications via one or more graphical user interface (GUI) screens associated with the workflow. The application is further configured to set a communication level for the workflow for the transaction. The communication level is determined based on the measure of interaction and without requiring an intervention. The application is further configured to determine, based on the communication level, a next communication to output. The next communication is output via the self-checkout kiosk, and the transaction is executed at the self-checkout kiosk.

Advantages of Self-Checkout Management Based on Computer Vision or Workflow Interaction By managing self-checkout kiosks based on computer vision and workflow interaction using the techniques disclosed herein, self-checkout kiosks can be configured to account for detected item or payment types during a transaction and account for end-user interaction with the self-checkout kiosks during the transaction. For instance, the self-checkout kiosks can accept a detected item or payment type as input when processing the transaction, where the detected item or payment type can be accepted without requiring end-user intervention via the self-checkout kiosks. Additionally or alternatively, the self-checkout kiosks can reduce required communications when interacting with the self-checkout kiosk is detected as indicating experienced usage, such as when a rate of interaction exceeds a first threshold rate. In contrast, the self-checkout kiosks can increase required communications when interaction with the self-checkout kiosk is detected as indicating inexperienced usage, such as when a rate of interaction falls short of a second threshold rate, where the second threshold rate is lower than the first threshold rate. In other embodiments, the first and second threshold rates have the same value.

Advantageously, accounting for a detected item, payment type, and/or end-user interaction can result in a reduction of steps required to be executed in a workflow associated with the transaction. As a result, a computational overhead of processing transactions at the self-checkout kiosks can be reduced, thereby improving transaction processing at the self-checkout kiosks at least in terms of speed and throughput, such as in terms of average transaction processing speed. The speed and throughput are increased at least because the self-checkout kiosks need not incur a time delay associated awaiting and receiving certain kinds of input, such as input specifying the item or payment type.

Figure 1:
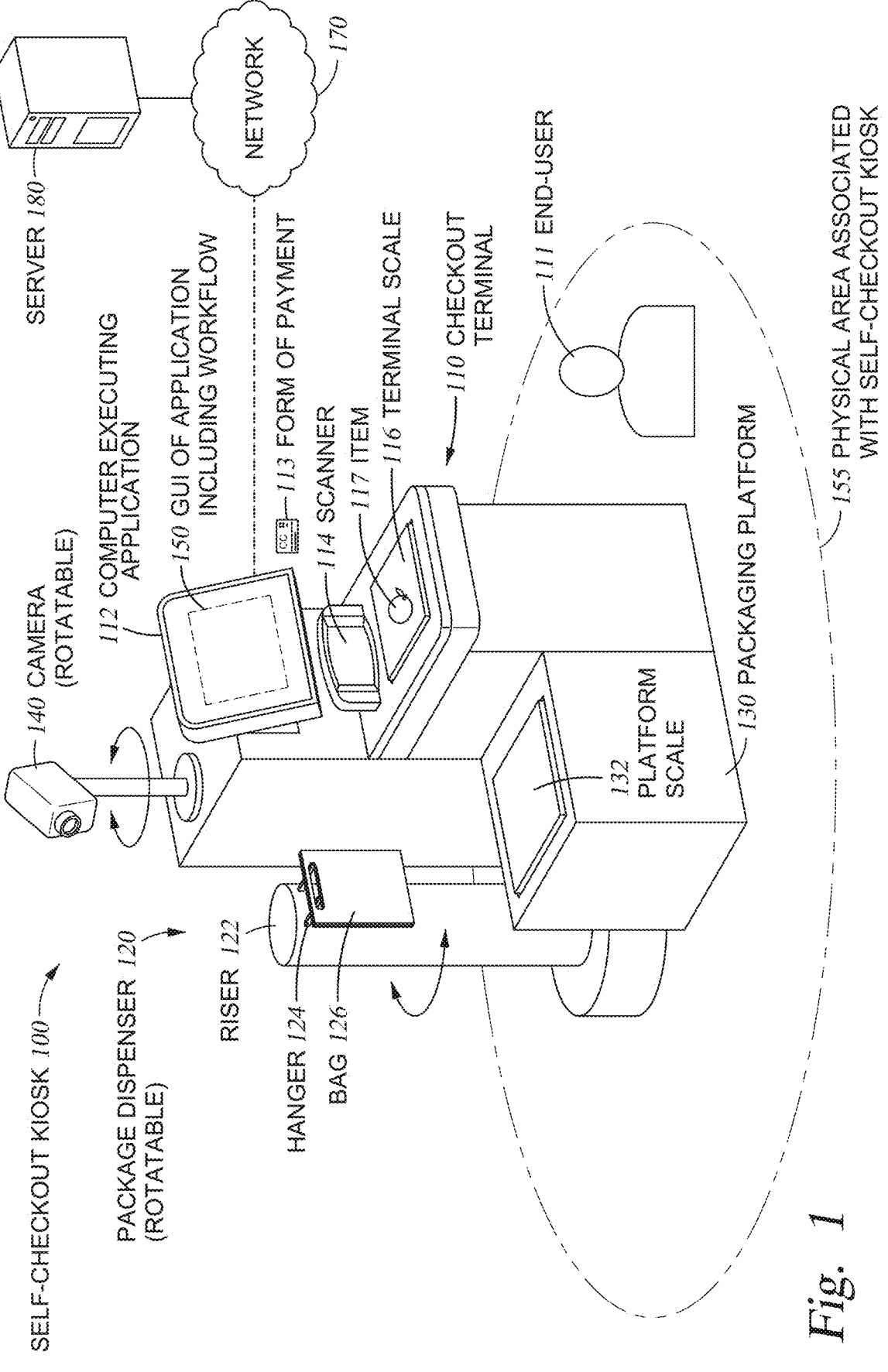
FIG. 1 illustrates a self-checkout kiosk that is manageable based on computer vision, according to one embodiment presented in this disclosure.

FIG. 1 illustrates a self-checkout kiosk 100 that is manageable based on computer vision, according to one embodiment. As shown, the self-checkout kiosk 100 includes a checkout terminal 110, a package dispenser 120, and a packaging platform 130. The self-checkout kiosk 100 includes a camera 140 that is disposed atop a rear section of the checkout terminal 110. The camera 140 can have a field of view that includes the checkout terminal 110, the package dispenser 120, and/or the packaging platform 130. In some embodiments, the field of view of the camera 140 is adjustable over time, such as by rotating the camera 140 about one or more axes associated with the camera 140. In some embodiments, multiple cameras, including the camera 140, can be included in the self-checkout kiosk 100. Depending on the embodiment, the camera(s) can be part of the checkout terminal 110, the package dispenser 120, and/or packaging platform 130.

In one embodiment, the checkout terminal 110 includes a computer 112, a scanner 114, and a terminal scale 116. As shown, the scanner 114 is included in the rear section of the checkout terminal 110, while the terminal scale 116 is included in a front section of the checkout terminal 110. The computer 112 includes a display and various controls to permit a user to view a current transaction and provide input to the checkout terminal 110 for how to proceed. The controls can include a touch screen, a signature pad, buttons, a chip reader, and/or the like. The computer 112 executes an application configured to perform the techniques disclosed herein. The application can generate one or more graphical user interface (GUI) screens for output via the display, where the one or more GUI screens include the GUI 150.

The computer 112 can also be operatively connected to other computers via a network 170, according to one embodiment. As shown, the other computers include a server 180. Further, the application executes on the computer 112. In certain embodiments, some or all of the functionality of the application can be performed by the server 180. The application captures one or more graphical images that at least partially depict a physical area 155 associated with the self-checkout kiosk 110 during a transaction that includes one or more items. The application is configured to output one or more communications via one or more graphical user interface (GUI) screens associated with a workflow of the application. The GUI screens include the GUI 150.

In one embodiment, the workflow includes a predefined sequence of steps to process a transaction at the self-checkout kiosk 100. Further, the workflow can include branching steps. The decision to advance from one sequential step to the next when the steps are a linear sequence of steps, or the branches to be taken when the steps are a branching pattern of steps, are determined based on end-user input. Additionally or alternatively, in some embodiments, the decision to advance or the branches to be taken are determined using the techniques disclosed herein and without requiring any intervention in the form of end-user input.

As used herein, an intervention broadly refers to an incidence of involvement, on the part of an acting entity, in the processing of the transaction. A requiring of intervention broadly refers to a state, of the workflow as managed by the application when processing the transaction, in which an incidence of involvement on the part of an acting entity, is necessary in order for the application to progress the workflow to a next state toward completion of the transaction.

In some embodiments, each state corresponds to a respective step of the workflow and can include one or more state variables. For example, one of the state variables can track how many times a specific error type has been triggered during a transaction for purposes of raising an attendant alert as a form of escalation, once the tracked count exceeds a threshold. The acting entity can be a user, such as the end-user or the attendant, or can be a program such as the application. In certain embodiments, the intervention can take the form of a system interrupt, a stop command, a pause feature of a processing pipeline, and so forth.

An example workflow can include a first selection menu that includes options to scan a product or add an item of produce that is weighed rather than scanned. If the option to scan a product is selected, the application proceeds to workflow steps instructing to scan a product and displaying an indication of the scanned product (or that the product has been successfully scanned), respectively. On the other hand, if the option to add an item of produce is selected, the application proceeds to workflow steps instructing to specify a type of the produce, instructing to place the item of produce on the terminal scale 116, and displaying an indication of the weight detected by the terminal scale 116 (or that the item has been successfully weighted), respectively.

Additionally or alternatively, the example workflow can include a second selection menu that includes options to pay by cash, credit card, or debit card, respectively. If the option to pay by cash is selected, the application proceeds to workflow steps instructing to insert cash into a bill acceptor component of the self-checkout kiosk 100 and displaying an indication of the detected amount of cash, respectively. On the other hand, if the option to pay by credit card is selected, the application proceeds to workflow steps instructing to swipe the credit card, instructing to provide a signature, and displaying an indication that payment using the credit card is successful, respectively. If the option to pay by debit card is selected, however, the application proceeds to workflow steps instructing to swipe the debit card, instructing to enter a personal identification number (PIN) for the debit card, and displaying an indication that payment using the debit card is successful, respectively.

Other steps in the example workflow are broadly contemplated, including steps to select a desired language for the GUI, indicate to the self-checkout kiosk payment readiness the part of the end-user, confirm to the self-checkout kiosk to complete the transaction, and request attendant assistance, respectively. Still other steps include steps to scan a loyalty-program card, enter a barcode serial number of an item that the self-checkout kiosk continually fails to scan, apply a coupon for an item, and instruct to place an item on the platform scale for weighing, respectively.

In one embodiment, the application predicts an item type or a payment type desired for the transaction. Examples of payment type include cash and credit card. The prediction is made using one or more machine learning models and based on the one or more graphical images. The one or more machine learning models include the machine learning model 190. In some embodiments, the machine learning model 190 is a machine learning classification model, also referred to as a classifier. The application provides the item type or payment type as input to the workflow. The item type can be determined upon detecting that an item 117 has been placed on a scale associated with the self-checkout kiosk, such as the terminal scale 116, according to one embodiment.

The granularity of the item type can be tailored to suit the needs of a particular case, according to one embodiment. For instance, the item type can be as fine-grained as uniquely identifying an item from a set of available items. Alternatively, the item type can be as coarse-grained as identifying an item category selected from a set number of item categories.

In some embodiments, the application also predicts payment readiness and provides the detected payment readiness as an input to the workflow. The payment readiness of an end-user can be determined without requiring intervention on the part of the end-user. In one embodiment, the payment readiness can be detected upon determining that a set window of time has elapsed during which no further item has been added to the transaction at the self-checkout kiosk. In some embodiments, payment readiness can also be determined and provided as input to the workflow, upon determining a payment type based on a form of payment 113 depicted in the graphical image. In such embodiments, payment readiness can be determined even if the set window of time has not fully elapsed.

By providing the detected payment readiness as in input to the workflow, the application need not await or receive end-user input specifying payment readiness on part of the end-user. As a result, fewer workflow steps are required to be executed, and workflow execution can be streamlined when processing transactions at the self-check kiosks.

In addition to or as an alternative to predicting the item type or payment type, the application detects a measure of interaction, of an end-user 111, in the workflow and adjusts a communication level of the workflow based on measure of interaction, according to one embodiment. The measure of interaction is also referred to herein as a metric of interaction. The measure of interaction includes a rate of interaction in the workflow and/or a rate of repetition of steps in the workflow. Upon determining that the measure of interaction indicates greater experience, of the end-user 111, in using the self-checkout kiosk, the application adjusts the communication level to reduce an amount of communication associated with the workflow for the transaction, and vice versa. The communication level can be adjusted without requiring intervention on the part of an end-user or of an attendant at a physical location that includes the self-checkout kiosks.

In one embodiment, the communication level can be selected from a set number of communication levels. The set number of communication levels can include a first level, a second level of increased communication relative to the first level, and a third level of reduced communication relative to the first level. The first level can be a default level at least in some embodiments. The second level causes, at least in part, more types of communication or a greater amount of communication to be output relative to the first level. The third level causes, at least in part, fewer types of communication or a lesser amount of communication to be output relative to the first level.

In some embodiments, the communication level can be associated with a user account of the end-user 111. The communication level can be stored and retrieved to apply, at least by default, to a subsequent transaction during a subsequent visit by the end-user 111. In this regard, the communication level is applied upon identifying the end-user 111. At least in some embodiments, the application can identify the end-user 111 using facial recognition and based on captured graphical images depicting the end-user 111. The facial recognition can be performed based on a machine learning model.

Depending on the embodiment, the reduced amount of communication can entail a reduced number of GUI screens, a reduced amount of information output via GUI screens, and/or a reduced amount of information that an end-user is requested to input via GUI screens. Each communication can be of a communication type selected from a notification, a prompt, and a menu. Each notification is of a notification type selected from an instructional notification, an informational notification, an error notification, and a warning notification.

In one embodiment, the rate of interaction of the end-user 111 characterizes a rate of navigation through GUI screens of the application. A higher rate of navigation indicates a greater amount of experience, of the end-user 111, in using the self-checkout kiosk, and vice versa. The rate of repetition of the end-user 111 characterizes an incidence of repeated navigation through certain GUI screens of the application, such as back-and-forth navigation. A higher rate of repetition indicates a lesser amount of experience, of the end-user 111, in using the self-checkout kiosk, and vice versa.

A greater amount of experience in using the self-checkout kiosk can be predicted based on determining that the measure of interaction exceeds a first threshold measure, in one embodiment. In contrast, a lesser amount of experience in using the self-checkout kiosk can be predicted based on determining that the measure of interaction falls short of a second threshold measure. In certain embodiments, the second threshold measure is lower than the first threshold measure. In other embodiments, the first and second threshold rates are substantially equal in measure.

In one embodiment, the application subsequently approves and concludes the transaction at the self-checkout kiosk. By configuring self-checkout kiosks to account for a detected item, payment type, and/or interaction, a number of steps requiring execution can be reduced in a workflow associated with the transaction. As a result, a computational overhead of processing transactions at the self-checkout kiosks can be reduced at least in some cases.

In one embodiment, the scanner 114 identifies various items that are part of the current transaction, where the various items can be identified via a bar code and/or image recognition software. The terminal scale 116 measures a weight of any items placed on the terminal scale 116, where the items can be produce in a grocery environment, such as the item 117. Depending on the embodiment, the weight of an item 117 can be determined by measuring the weight of the item when the item is placed on the terminal scale 116 and/or by querying a table or database to retrieve a specified weight of the item 117. The checkout terminal 110 can be in wired or wireless communication with the package dispenser 120, the packaging platform 130, the camera 140, one or more attendant kiosks, one or more other self-checkout kiosks, a backend database, and/or other devices in a retail environment, e.g., a user phone for near-field communication.

The packaging platform 130 provides one or more types of packaging to one or more checkout terminals, according to one embodiment. The packaging is provided for selection for packing goods as part of the current transaction. The packaging platform 130 includes a platform scale 132 that measures a weight of items placed on the platform scale 132. The items can include various goods included in the current transaction, packages for those goods, such as the bag 126, and/or various goods that are not included in the current transaction but that a user nevertheless placed, either intentionally or inadvertently, in the packing area. The packaging platform 130 reports the weight measured by the platform scale 132 to the checkout terminal 110.

In one embodiment, the package dispenser 120 is of a carousel type and includes a riser 122 that provides a hanger 124. In some embodiments, the hanger 124 can runs for a specified distance from the riser 122 to end at a catch distal to an attachment point of the hanger 124 to the riser 122. The catch prevents the bag 126 from falling off of the hanger 124, such as when the hanger 124 is at an acute angle relative to the riser 122. The riser 122 is selectively rotatable around a vertical axis of the riser 122 to a variety of rotational positions. Each rotational position can present certain bags into the reach of the user while placing other bags out of reach of the user. For instance, although the riser 122 is shown as being rotated to present the bag 126 to the user, the riser 122 can be further rotated to present other bags (not shown) to the user while moving the bag 126 out of reach of the end-user.

Figure 2:
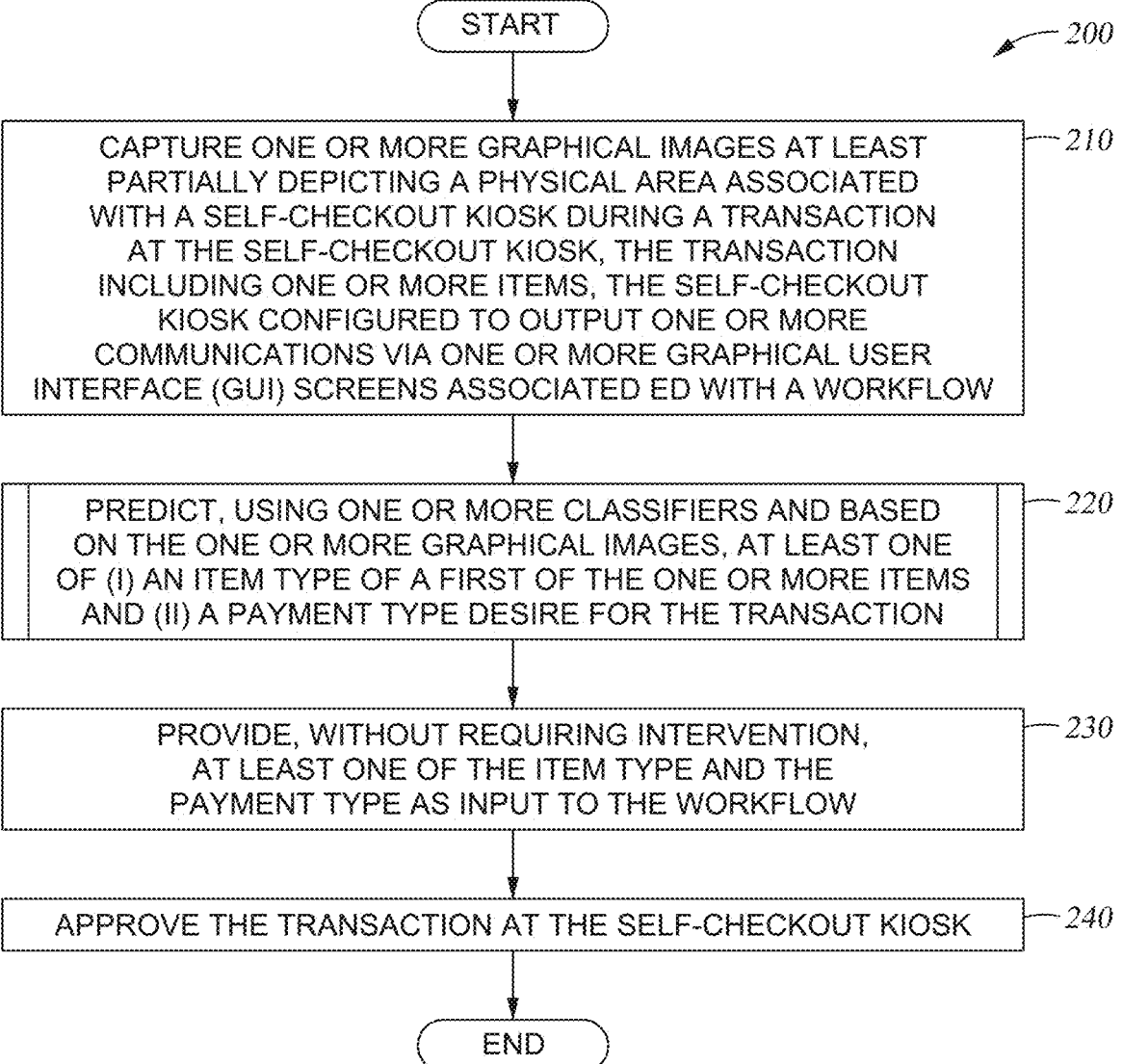
FIG. 2 is a flowchart depicting a method to manage the self-checkout kiosk based on computer vision, according to one embodiment presented in this disclosure.

FIG. 2 is a flowchart depicting a method 200 to manage the self-checkout kiosk based on computer vision, according to one embodiment. The method 200 can be performed by the application executing on the computer 112 and/or by the server 180 of FIG. 1. As shown, the method 200 begins at step 210, where the application captures one or more graphical images at least partially depicting a physical area associated with a self-checkout kiosk during a transaction. The transaction includes one or more items. The self-checkout kiosk, or more specifically, the application, is configured to output one or more communications via one or more graphical user interface (GUI) screens associated with a workflow for processing transactions.

At step 220, the application predicts at least one of an item type of a first of the one or more items, and a payment type desired for the transaction. The item type and/or payment type can be predicted using one or more classifiers and based on the one or more graphical images. The step 220 is further described in conjunction with FIG. 3. At step 230, the application provides, without requiring end-user intervention via the self-checkout kiosk, at least one of the item type and the payment type as input to the workflow. At step 240, the application approves the transaction at the self-checkout kiosk. After the step 240, the method 200 terminates.

As described above, in some embodiments, some or all of the functionality of the application can be performed by the server. For instance, in an alternative embodiment, the step 220 is performed by the server, while the steps 210, 230, and 240 are performed by the application. In such an embodiment, the application sends the graphical images to the server via the network, and the server sends the predictions to the application via the network.

Figures 3, 4:
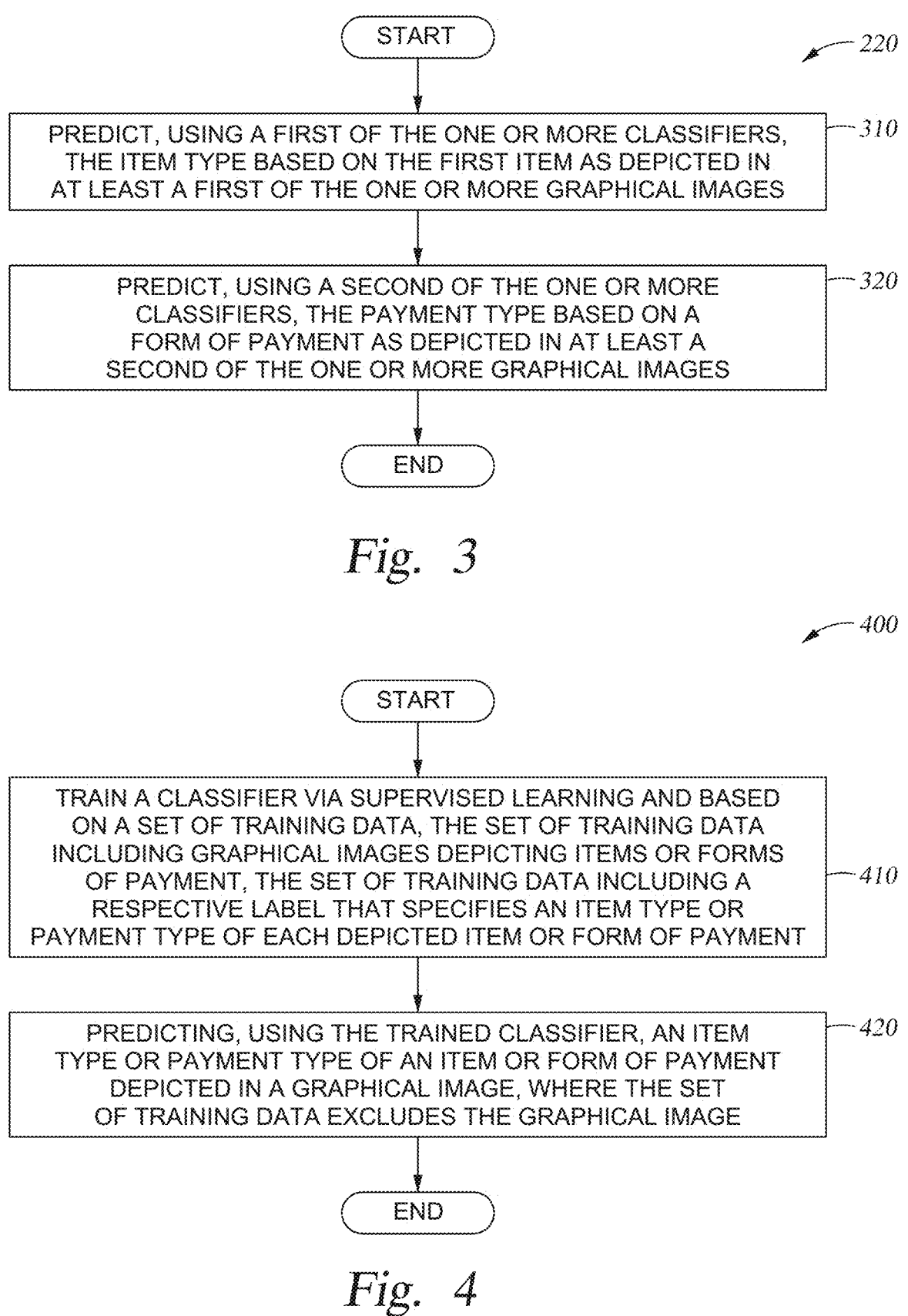
FIG. 3 is a flowchart depicting a method to generate a prediction using a classifier and based on a graphical image, according to one embodiment presented in this disclosure.
FIG. 4 is a flowchart depicting a method to train the classifier to generate the prediction, according to one embodiment presented in this disclosure.

FIG. 3 is a flowchart depicting a method to generate a prediction using a classifier and based on a graphical image, according to one embodiment. The method can correspond to the step 220 of FIG. 2. Further, the method can be performed by the application executing on the computer 112 of FIG. 1. As shown, the method begins at step 310, where the application predicts, using a first of one or more classifiers, the item type based on the first item as depicted in at least a first of one or more graphical images. At step 320, the application predicts, using a second of the one or more classifiers, the payment type based on a form of payment as depicted in at least a second of the one or more graphical images. After the step 320, the method terminates.

FIG. 4 is a flowchart depicting a method 400 to train the classifier to generate the prediction, according to one embodiment. Depending on the embodiment, the method can be performed by the server 180 or by the application executing on the computer 112 of FIG. 1. As shown, the method begins at step 410, where the server trains the classifier via supervised learning and based on a set of training data. The set of training data includes graphical images depicting items or forms of payment. Further, the set of training data includes a respective label that specifies an item type of each depicted item or a payment type for each depicted form of payment. At step 420, the application or server predicts an item type of a depicted item or a payment type of a depicted form of payment in a graphical image that is not included in the training data. The prediction is made using the trained classifier. After the step 420, the method 400 terminates.

FIG. 5 is a flowchart depicting a method 500 to manage the self-checkout kiosk based on workflow interaction, according to one embodiment. Depending on the embodiment, the method 500 can be performed by the application executing on the computer 112 and/or by the server 180 of FIG. 1. As shown, the method 500 begins at step 510, where the application determines a measure of interaction for at least a portion of the workflow during the transaction at the self-checkout kiosk. The measure of interaction is of an end-user and includes a rate of interaction and/or a rate of repetition of one or more steps of the workflow.

At step 520, the application determines, based on the measure of interaction, a communication level for the workflow for the transaction. The communication level is applied to at least a remainder of the workflow, the remainder being relative to the portion. Further, the communication level is determined without requiring intervention on the part of the end-user or of the attendant. For instance, the end-user and attendant need not specify or attempt to determine a communication level suitable for the end-user at the self-checkout kiosk.

At step 530, the application determines, based on the communication level, a next communication to output, where the next communication is output via the self-checkout kiosk. The communication level and/or the next communication can be determined based on a machine learning model, where the machine learning model can be trained at least in part using the techniques disclosed herein. Further, at least in some embodiments, the machine learning model is separate from the machine learning classification model that is used for detecting an item or payment type. After the step 530, the method 500 terminates.

Figure 6:
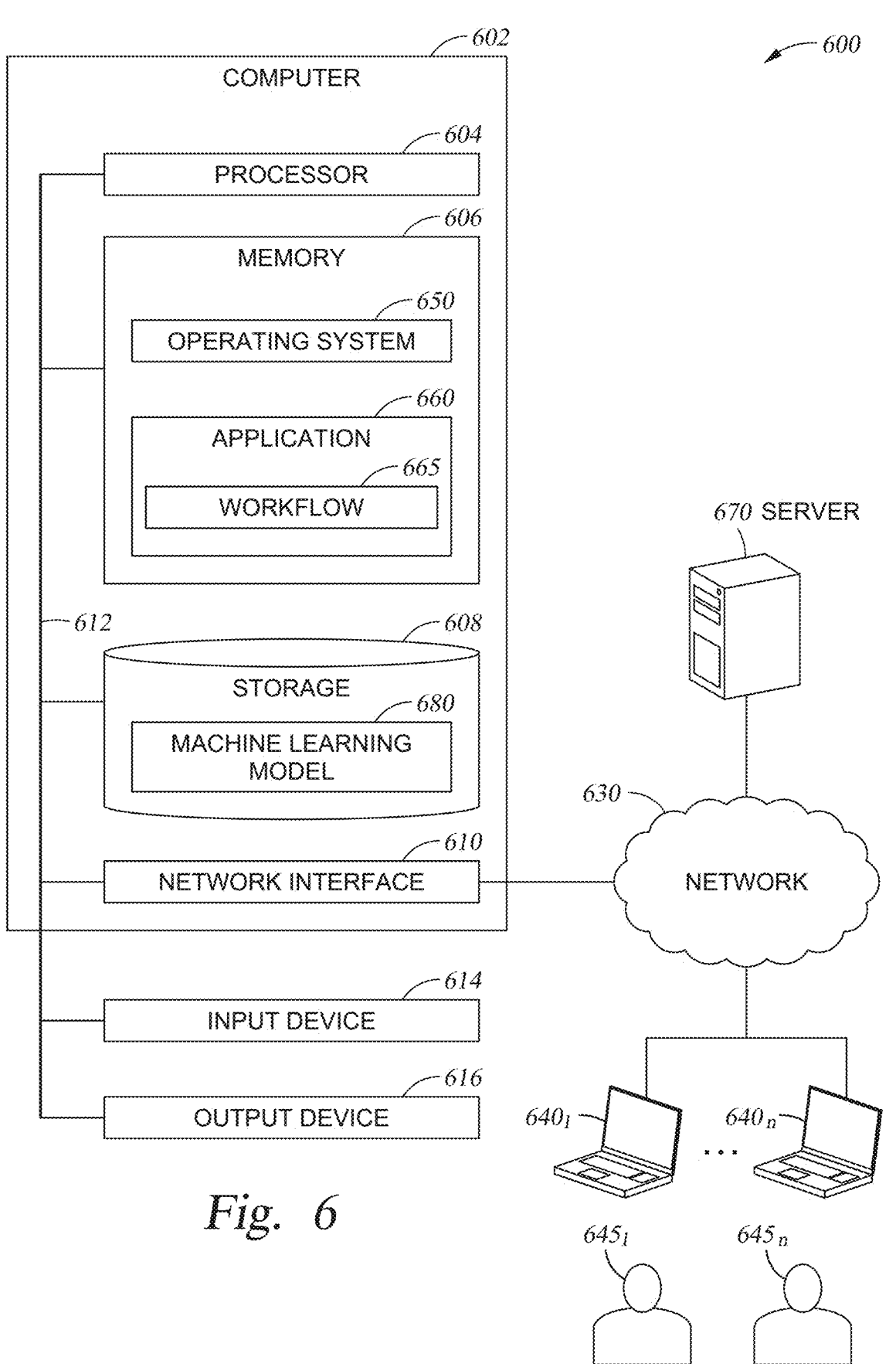
FIG. 6 is a block diagram illustrating components of a computing environment for self-checkout management based on computer vision or workflow interaction, according to one embodiment presented in this disclosure.

FIG. 6 is a block diagram illustrating components of a computing environment 600 for self-checkout management based on computer vision or workflow interaction, according to one embodiment. The computing environment 600 includes a computer 602 configured to connect to other computers via a network 630. As shown, the other computers include a server 670. In general, the network 630 can be a telecommunications network and/or a wide area network (WAN). In a particular embodiment, the network 630 is the Internet.

The computer 602 generally includes a processor 604 connected via a bus 612 to a memory 606, a network interface device 610, a storage 608, an input device 614, and an output device 616. The computer 602 is generally under the control of an operating system. Examples of operating systems include UNIX, versions of the Microsoft Windows® operating system, and distributions of the Linux® operating system. More generally, any operating system supporting the functions disclosed herein can be used.

The processor 604 is included to be representative of a single CPU, multiple CPUs, a single CPU having multiple processing cores, and the like. Similarly, the memory 606 can be a random access memory. While the memory 606 is shown as a single identity, it should be understood that the memory 606 can comprise a plurality of modules, and that the memory 606 can exist at multiple levels, from high speed registers and caches to lower speed but larger DRAM chips. The network interface device 610 can be any type of network communications device allowing the computer 602 to communicate with the other computers $640_{1-n}$ via the network 630.

The storage 608 can be a persistent storage device. Although the storage 608 is shown as a single unit, the storage 608 may be a combination of fixed and/or removable storage devices, such as fixed disc drives, solid state drives, floppy disc drives, tape drives, removable memory cards or optical storage. The memory 606 and the storage 608 may be part of one virtual address space spanning multiple primary and secondary storage devices. As shown, the storage includes machine learning models 680, which can include the machine learning model 190 of FIG. 1.

The input device 614 can be any device for providing input to the computer 602. For example, a keyboard and/or a mouse may be used. The output device 616 may be any device for providing output to a user of the computer 602. For example, the output device 616 may be any conventional display screen or set of speakers. Although shown separately from the input device 614, the output device 616 and input device 614 may be combined. For example, a display screen with an integrated touch-screen may be used.

As shown, the memory 606 of the computer 602 includes an operating system 650 providing an execution environment in which an application 660 can execute. In some embodiments, the application 660 can correspond to the application executing on the computer 112 of FIG. 1. Additionally or alternatively, the server 670 can correspond to the server 180 of FIG. 1.

The application 660 includes a workflow 665 used by the application 660 to determine GUI screens, according to one embodiment. The application 660 can also detect measures of interaction for the workflow 665 and set communication levels for the workflow 665. By configuring self-checkout kiosks to account for a detected item, payment type, and/or interaction, a count of steps requiring execution can be reduced in a workflow associated with the transaction. As a result, a computational overhead of processing transactions at the self-checkout kiosks can be reduced.

The descriptions of the various embodiments in the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects in the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects in the present disclosure may be a system, a method, and/or a computer program product. The computer program product may include a computer readable storage medium (or media) having computer readable program instructions thereon for causing a processor to carry out aspects in the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations in the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects in the present disclosure.

Aspects in the present disclosure are described herein with reference to flowchart illustrations and/or block diagrams of methods, apparatus (systems), and computer program products according to embodiments in the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments in the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments in the present disclosure, other and further embodiments may be devised without departing from the basic scope thereof, and the scope thereof is determined by the claims that follow.

What is claimed is:

1. A computer-implemented method comprising:
determining a measure of interaction for at least a portion of a workflow during a transaction at a self-checkout kiosk, the self-checkout kiosk configured to output one or more communications via one or more graphical user interface (GUI) screens associated with the workflow;
setting a communication level for the workflow for the transaction, wherein the communication level is determined based on the measure of interaction and without requiring an intervention;
determining, based on the communication level and by operation of one or more computer processors, a next communication to output, wherein the next communication is output via the self-checkout kiosk;
receiving one or more graphical images at least partially depicting a physical area associated with the self-checkout kiosk during the transaction, which is associated with: (i) one or more items and (ii) a form of payment at the self-checkout kiosk, the one or more graphical images comprising a first of the one or more items, wherein the one or more graphical images depict the form of payment, and wherein one or more classifiers includes at least one of: a first classifier configured to predict an item type based on a first item in the one or more graphical images; or a second classifier configured to predict a payment type based on the form of payment as depicted in the one or more graphical images;
predicting, using the one or more classifiers and based on the one or more graphical images, at least one of: (i) the item type of the first item or (ii) the payment type of the form of payment;
providing, without requiring an intervention, at least one of the item type or the payment type as input to the workflow; and
executing the transaction at the self-checkout kiosk.

2. The computer-implemented method of claim 1, wherein the measure of interaction includes at least one of a rate of interaction or a rate of repetition of steps of the workflow, and wherein the communication level applies at least in part to at least a remainder of the workflow, the remainder being relative to the portion.

3. The computer-implemented method of claim 1, wherein providing the at least one of the item type and the payment type as input to the workflow causes at least a given one of the one or more communications to be at least partially omitted from being output.

4. The computer-implemented method of claim 3, wherein the given communication is at least partially omitted from being output, wherein the given communication is associated with explicitly specifying at least one of the item type, the payment type, and payment readiness.

5. The computer-implemented method of claim 3, wherein the given communication includes at least one of a notification, a prompt, or a menu, and wherein the notification is selected from an instructional notification, an informational notification, an error notification, and a warning notification.

6. The computer-implemented method of claim 1, further comprising:
determining that the first item has been placed on a scale associated with the self-checkout kiosk, whereupon the item type is predicted; and
determining that a window of time has elapsed in which no item has been added to the transaction at the self-checkout kiosk, whereupon payment readiness for the transaction is determined without requiring an intervention.

7. The computer-implemented method of claim 1, wherein the one or more classifiers are trained via supervised learning and based on a set of training data, and wherein each of the one or more classifiers comprises a machine learning classification model.

8. The computer-implemented method of claim 1, wherein at least one of the communication level or the next communication is determined based on a machine learning model.

9. The computer-implemented method of claim 1, wherein the communication level is selected from a plurality of communication levels, the plurality of communication levels including (i) a first level, (ii) a second level of increased communication relative to the first level, and (iii) a third level of reduced communication relative to the first level; and
wherein the second level causes, at least in part, more types of communication or a greater amount of communication to be output relative to the first level, and wherein the third level causes, at least in part, fewer types of communication or a lesser amount of communication to be output relative to the first level.

10. The computer-implemented method of claim 1, further comprising:

determining that the first item has been placed on a scale associated with the self-checkout kiosk, whereupon the item type is predicted; and determining that a window of time has elapsed in which no item has been added to the transaction at the self-checkout kiosk, whereupon payment readiness for the transaction is determined without requiring an intervention.

11. A system comprising:

one or more computer processors; and a memory containing a program executable by the one or more computer processors to perform an operation comprising:

determining a measure of interaction for at least a portion of a workflow during a transaction at a self-checkout kiosk, the self-checkout kiosk configured to output one or more communications via one or more graphical user interface (GUI) screens associated with the workflow;

setting a communication level for the workflow for the transaction, wherein the communication level is determined based on the measure of interaction and without requiring an intervention;

determining, based on the communication level and by operation of one or more computer processors, a next communication to output, wherein the next communication is output via the self-checkout kiosk;

receiving one or more graphical images at least partially depicting a physical area associated with the self-checkout kiosk during the transaction, which is associated with (i) one or more items and (ii) a form of payment at the self-checkout kiosk, the one or more graphical images comprising a first of the one or more items, wherein the one or more graphical images depict the form of payment, and wherein one or more classifiers includes at least one of: a first classifier configured to predict an item type based on a first item in the one or more graphical images; or a second classifier configured to predict a payment type based on the form of payment as depicted in the one or more graphical images;

predicting, using the one or more classifiers and based on the one or more graphical images, at least one of (i) the item type of the first item or (ii) the payment type of the form of payment;

providing, without requiring an intervention, at least one of the item type or the payment type as input to the workflow; and executing the transaction at the self-checkout kiosk.

12. The system of claim 11, wherein the measure of interaction includes at least one of a rate of interaction or a rate of repetition of steps of the workflow, and wherein the communication level applies at least in part to at least a remainder of the workflow, the remainder being relative to the portion.

13. The system of claim 11, wherein at least one of the communication level or the next communication is determined based on a machine learning model.

14. A non-transitory computer-readable medium containing a program executable to perform an operation comprising:

determining a measure of interaction for at least a portion of a workflow during a transaction at a self-checkout kiosk, the self-checkout kiosk configured to output one or more communications via one or more graphical user interface (GUI) screens associated with the workflow;

setting a communication level for the workflow for the transaction, wherein the communication level is determined based on the measure of interaction and without requiring an intervention;

determining, based on the communication level and by operation of one or more computer processors, a next communication to output, wherein the next communication is output via the self-checkout kiosk;

receiving one or more graphical images at least partially depicting a physical area associated with the self-checkout kiosk during the transaction, which is associated with (i) one or more items and (ii) a form of payment at the self-checkout kiosk, the one or more graphical images comprising a first of the one or more items, wherein the one or more graphical images depict the form of payment, and wherein one or more classifiers includes at least one of: a first classifier configured to predict an item type based on a first item in the one or more graphical images; or a second classifier configured to predict a payment type based on the form of payment as depicted in the one or more graphical images;

predicting, using the one or more classifiers and based on the one or more graphical images, at least one of (i) the item type of the first item or (ii) the payment type of the form of payment;

providing, without requiring an intervention, at least one of the item type or the payment type as input to the workflow; and executing the transaction at the self-checkout kiosk.

15. The non-transitory computer-readable medium of claim 14, wherein the measure of interaction includes at least one of a rate of interaction or a rate of repetition of steps of the workflow, and wherein the communication level applies at least in part to at least a remainder of the workflow, the remainder being relative to the portion.

16. The non-transitory computer-readable medium of claim 14, wherein the one or more graphical images depict the form of payment, and wherein the one or more classifiers includes at least one of:

a first classifier configured to predict the item type based on the first item in the one or more graphical images; or a second classifier configured to predict the payment type based on the form of payment as depicted in the one or more graphical images.

* * * * *